(12) United States Patent
Liang et al.

(10) Patent No.: US 11,748,215 B2
(45) Date of Patent: Sep. 5, 2023

(54) LOG MANAGEMENT METHOD, SERVER, AND DATABASE SYSTEM

(71) Applicant: Huawei Technologies Co., Ltd., Shenzhen (CN)

(72) Inventors: Xiaohao Liang, Hangzhou (CN); Huimin Zhang, Shenzhen (CN); Weisong Wang, Shenzhen (CN); Tieying Wang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 631 days.

(21) Appl. No.: 16/892,590

(22) Filed: Jun. 4, 2020

(65) Prior Publication Data

US 2020/0293412 A1    Sep. 17, 2020

Related U.S. Application Data

(63) Continuation of application No. PCT/CN2017/114647, filed on Dec. 5, 2017.

(51) Int. Cl.
*G06F 11/14* (2006.01)
*G06F 16/23* (2019.01)

(52) U.S. Cl.
CPC ...... *G06F 11/1471* (2013.01); *G06F 11/1469* (2013.01); *G06F 11/1474* (2013.01); *G06F 16/2379* (2019.01); *G06F 2201/84* (2013.01)

(58) Field of Classification Search
None
See application file for complete search history.

(56) References Cited

U.S. PATENT DOCUMENTS

| 2005/0033779 | A1 | 2/2005 | Seki et al. | |
| 2016/0070589 | A1* | 3/2016 | Vermeulen | G06F 9/466 |
| | | | | 711/153 |
| 2016/0371356 | A1 | 12/2016 | Lee et al. | |
| 2016/0371357 | A1 | 12/2016 | Park et al. | |
| 2017/0046234 | A1* | 2/2017 | Yang | G06F 16/2365 |

FOREIGN PATENT DOCUMENTS

| CN | 1784677 A | 6/2006 |
| CN | 101159003 A | 4/2008 |
| CN | 101464890 A | 6/2009 |
| CN | 101980203 A | 2/2011 |
| CN | 102662796 A | 9/2012 |
| CN | 103049355 A | 4/2013 |

(Continued)

OTHER PUBLICATIONS

Yao, C., et al. "Adaptive Logging for Distributed In-memory Databases," SoCC, Aug. 15, 2015, pp. 1-13.

(Continued)

*Primary Examiner* — Eddy Cheung
(74) *Attorney, Agent, or Firm* — Conley Rose, P.C.

(57) ABSTRACT

In a log management method performed by a server, the server receives a transaction and generates a command log of the transaction. When detecting the transaction is a multi-partition transaction or a non-deterministic transaction, the server generates a data log of the transaction. When the server is faulty, the server recovers data according to the command log or the data log.

20 Claims, 6 Drawing Sheets

(56) References Cited

FOREIGN PATENT DOCUMENTS

| CN | 103092903 A | 5/2013 |
|----|-------------|--------|
| CN | 104486107 A | 4/2015 |
| CN | 104980307 A | 10/2015 |
| CN | 106202305 A | 12/2016 |
| EP | 1315074 A2 | 5/2003 |

OTHER PUBLICATIONS

Wu, Y., et al., "Parallel Database Recovery for Multicore MainMemory Databases," arxiv.org, Cornell University Library, 201 Olin Library Cornell University Ithaca, NY 14853, XP080694833, Apr. 12, 2016, 12 pages.

Qin, D., et al., "Scalable replay-based replication for fast databases," Proceedings of the VLDB Endowment, vol. 10, No. 13, XP055632384, Sep. 1, 2017, pp. 2025-2036.

\* cited by examiner

LOG MANAGEMENT METHOD, SERVER, AND DATABASE SYSTEM

CROSS-REFERENCE TO RELATED APPLICATIONS

This is a continuation of Int'l Patent App. No. PCT/CN2017/114647 filed on Dec. 5, 2017, which is incorporated by reference.

TECHNICAL FIELD

This disclosure relates to the computer field, and in particular, to a log management method, a server, and a database system.

BACKGROUND

A database log is also referred to as a transaction log, records a history of an operation performed on a database (to be specific, records a modification to the database), is a very important part of the database, and is used to recover stored data in the case of a system crash or fault.

The database log is classified into a command log and a data log. The command log records a transaction command for the database, and does not record a result of a transaction operation. The data log records the result of the transaction operation.

A log has two functions: backup and copy replication. When a server node of a database system is faulty and data is lost, a command log or a data log can be used to recover the data. A slave node can synchronize with a master node by replaying the command log or the data log generated by the master node. Currently, the database system usually uses a fixed and single log policy.

SUMMARY

A log management method, a server, and a database system are disclosed. After receiving a transaction, a server node identifies a type of the transaction, and chooses to generate and store logs of different types based on the type of the transaction.

According to a first aspect, a database log management method includes: receiving, by a server, a first write transaction; generating and storing a command log of the first write transaction; detecting whether the first write transaction is a multi-partition transaction; and when the first write transaction is a multi-partition transaction, generating and storing, by the server, a data log of the first write transaction, where the multi-partition transaction includes a transaction for operating at least two partitions.

In an execution process of a multi-partition transaction, mutual communication or coordination between partitions may be required. Consequently, usually the execution process is relatively complex, and an execution time is relatively long. For the multi-partition transaction, a server node generates and stores a data log of the transaction. When the server node rectifies a fault or a slave node synchronizes data subsequently, only the data log needs to be replayed. After receiving a write transaction request, the server node generates a command log of a write transaction regardless of a type of the write transaction, thereby reducing system complexity. For a write transaction whose data log is not generated, a command log serves as a backup of the server node. For a write transaction whose data log is generated, a command log may have a marking function, and no extra marking information may be required. A storage sequence of the command log represents an execution sequence of the write transaction.

According to the first aspect, in a first possible implementation of the first aspect, when a data fault occurs on the server and data is lost, the server obtains a data snapshot and command logs generated after a generation time point of the data snapshot, and sequentially detects, in a storage sequence of the command logs, whether write transactions corresponding to the obtained command logs are multi-partition transactions. If detecting that the write transaction corresponding to the obtained command log is a multi-partition transaction, the server obtains a data log of the write transaction corresponding to the command log, and recovers the data by replaying the obtained data log. If detecting that the write transaction corresponding to the obtained command log is not a multi-partition transaction, the server node may recover the data by replaying the command log. Certainly, even if the write transaction is not a multi-partition transaction, if the write transaction has a data log, the server node may also recover the data by replaying the data log of the write transaction.

The data snapshot is used to back up data for the server. The data snapshot may be specifically a latest data snapshot of the server. The server may periodically back up the data snapshot in a time period. A recovery speed may be increased by selecting the latest data snapshot during data recovery. During the data recovery, the server determines the type of the write transaction based on a stored command log. If the write transaction is a multi-partition transaction, the data log of the write transaction is obtained, and the data is recovered by replaying the data log. This ensures a data recovery speed.

According to the first aspect, in a second possible implementation of the first aspect, the method further includes: receiving, by the server, a second write transaction; generating and storing a command log of the second write transaction; detecting whether the second write transaction is a non-deterministic transaction; and when detecting that the second write transaction is a non-deterministic transaction, generating and storing a data log of the second write transaction.

The non-deterministic transaction is a transaction whose two execution results may be different, and at least two execution results of the non-deterministic transaction are not unique. When the data is recovered by using a command log of a non-deterministic transaction, an execution result of the non-deterministic transaction may be different from an original result, and as a result, a data error occurs. In some approaches, a service needs to be processed to convert a non-deterministic write transaction to a deterministic write transaction, for example, not using a non-deterministic function, or using a special function or method, to ensure that a write transaction is not a non-deterministic transaction, so as to avoid an error in the data recovery. Consequently, a service development workload is increased. The foregoing problem is resolved on a server side by using an appropriate log management policy. The server node detects whether a received write transaction is a non-deterministic transaction, and if the write transaction is a non-deterministic transaction, generates and stores a data log of the write transaction, and recovers data of the non-deterministic transaction by using the data log subsequently. This ensures that a recovery result is the same as the original result when recovering the data. The server may first determine whether the write transaction is a multi-partition transaction, and determine whether the write transaction is a non-deterministic transaction when the write transaction is not a multi-partition transaction. Alternatively, the server may first determine whether the write transaction is a non-deterministic transaction, and then determine whether the write transaction is a multi-partition transaction when the write transaction is not a non-deterministic transaction.

According to the second possible implementation of the first aspect, in a third possible implementation of the first aspect, the method further includes: when a fault occurs and data is lost, obtaining, by the server, a data snapshot and command logs generated after a generation time point of the data snapshot, and detecting whether a write transaction corresponding to the obtained command log is a non-deterministic transaction or a multi-partition transaction; and when detecting that the write transaction corresponding to the obtained command log is a non-deterministic transaction or a multi-partition transaction, obtaining a data log of the write transaction corresponding to the command log, and recovering the data by replaying the obtained data log. If the write transaction is not a non-deterministic transaction, the slave node may keep data synchronized with that of the server node by replaying the obtained command log. Certainly, even if the write transaction is not a non-deterministic transaction, if the write transaction has a data log, the slave node may still keep the data synchronized with that of the server node by replaying the data log of the write transaction.

A flexible log management policy cannot only ensure correctness of the data recovery, but also accelerate the data recovery with relatively small data recovery complexity. The data snapshot is used to back up data for the server. The data snapshot may be specifically the latest data snapshot of the server. The server may periodically back up the data snapshot in the time period. The recovery speed may be increased by selecting the latest data snapshot during the data recovery.

According to any one of the first aspect or the foregoing possible implementations of the first aspect, in a fourth possible implementation of the first aspect, the server stores the data log of the first write transaction in an asynchronous storage manner, that is, stores the data log of the first write transaction after sending a response message of the first write transaction. The data log of the second write transaction is stored in a synchronous manner, in other words, the data log of the second write transaction needs to be stored before a response message of the second write transaction is sent. The response message of the first write transaction is used to indicate that execution of the first write transaction is completed, and the response message of the second write transaction is used to indicate that execution of the second write transaction is completed.

Synchronous storage has high security but affects overall performance of a system. Two execution results of a non-deterministic transaction may be different. A master node cannot recover data of the non-deterministic transaction based on a command log, and the slave node cannot keep data synchronized with that of the master node based on the command log. The system has high requirements on security of a data log of the non-deterministic transaction. For a multi-partition transaction, the master node may recover data based on a command log of the multi-partition transaction, and the slave node may also keep the data synchronized with that of the master node based on the command log of the multi-partition transaction. The server node may use different data log storage policies for the non-deterministic transaction and the multi-partition transaction.

According to any one of the first aspect or the foregoing possible implementations of the first aspect, in a fifth possible implementation of the first aspect, the server stores the command log of the write transaction in the synchronous manner. To be specific, before the response message of the first write transaction is sent, the command log of the first write transaction is stored. Before the response message of the second write transaction is sent, the command log of the second write transaction is stored. The response message of the first write transaction is used to indicate that the execution of the first write transaction is completed, and the response message of the second write transaction is used to indicate that the execution of the second write transaction is completed.

A command log does not depend on an execution result of a transaction and does not affect execution of the transaction. After receiving a write transaction, the server node may directly generate a command log. Execution of the transaction and generation of the command log may be performed in parallel. The server node may select a more secure storage policy to store the command log of the transaction.

According to any one of the first aspect or the foregoing possible implementations of the first aspect, in a sixth possible implementation of the first aspect, the server stores the command log and the data log of the first write transaction in a shared storage system, and shares the shared storage system with the slave node of the server. The server further stores the data log and the command log of the second write transaction in the shared storage system.

The slave node of the server node may obtain the data log of the first write transaction from the shared storage system, and keep the data synchronized with that of the server node by replaying the data log of the first write transaction.

According to any one of the first aspect or the foregoing possible implementations of the first aspect, in a seventh possible implementation of the first aspect, the method further includes: sending, by the server, the command log of the first write transaction and the data log of the first write transaction to the slave node of the server; further sending, by the server node, the command log and the data log of the second write transaction to the slave node of the server, so that the slave node of the server node keeps the data synchronized with that of the server node by replaying the data log of the first write transaction.

According to a second aspect, a readable medium includes an executable instruction, where when a processor of a computing device executes the executable instruction, the computing device performs the method according to any one of the first aspect or the foregoing possible implementations of the first aspect.

According to a third aspect, a computing device includes a processor, a memory, and a bus, where the memory is configured to store an executable instruction, the processor and the memory are connected by using the bus, and when the computing device runs, the processor executes the executable instruction stored in the memory, and the computing device is enabled to perform the method according to any one of the first aspect or the foregoing possible implementations of the first aspect.

According to a fourth aspect, a server, applied to a database system, is disclosed. The server includes a receiving unit configured to receive a first write transaction; a generation unit configured to generate a command log of the first write transaction; a detection unit configured to detect whether the first write transaction is a multi-partition transaction, where the multi-partition transaction includes a transaction for operating at least two partitions, where the generation unit is further configured to generate a data log of the first write transaction when the detection unit detects that the first write transaction is a multi-partition transaction; and a storage unit configured to store the command log of the first write transaction and the data log of the first write transaction.

According to the fourth aspect, in a first possible implementation of the fourth aspect, the server further includes a recovery unit configured to: when the server is faulty, obtain a data snapshot of the server and command logs generated after a generation time point of the data snapshot; and when the detection unit detects that a write transaction corresponding to the obtained command log is a multi-partition transaction, obtain a data log of the write transaction corresponding to the obtained command log, and recover data by replaying the obtained data log.

According to the fourth aspect, in a second possible implementation of the fourth aspect, the receiving unit is further configured to receive a second write transaction; and the generation unit is further configured to generate a command log of the second write transaction; the detection unit is further configured to detect whether the second write transaction is a non-deterministic transaction, where at least two execution results of the non-deterministic transaction are not unique; the generation unit is further configured to generate a data log of the second write transaction when the detection unit detects that the second write transaction is a non-deterministic transaction; and the storage unit is further configured to store the command log of the second write transaction and the data log of the second write transaction.

According to the second possible implementation of the fourth aspect, in a third possible implementation of the fourth aspect, the server further includes a recovery unit configured to: when the server is faulty, obtain a data snapshot of the server and command logs generated after a generation time point of the data snapshot; and when the detection unit detects that a write transaction corresponding to the obtained command log is a non-deterministic transaction or a multi-partition transaction, obtain a data log of the write transaction corresponding to the obtained command log, and recover data by replaying the obtained data log, where the data snapshot is used to back up data for the server.

According to any one of the fourth aspect or the foregoing possible implementations of the fourth aspect, in a fourth possible implementation of the fourth aspect, the storage unit may store the data log of the first write transaction after the server sends a response message of the first write transaction, where the response message of the first write transaction is used to indicate that execution of the first write transaction is completed; and the storage unit is configured to store the data log of the second write transaction before the server sends a response message of the second write transaction, where the response message of the second write transaction is used to indicate that execution of the second write transaction is completed.

According to any one of the fourth aspect or the foregoing possible implementations of the fourth aspect, in a fifth possible implementation of the fourth aspect, the storage unit is configured to store the command log of the first write transaction before the server sends the response message of the first write transaction, where the response message of the first write transaction is used to indicate that the execution of the first write transaction is completed; and the storage unit is configured to store the command log of the second write transaction before the server sends the response message of the second write transaction, where the response message of the second write transaction is used to indicate that the execution of the second write transaction is completed.

According to any one of the fourth aspect or the foregoing possible implementations of the fourth aspect, in a sixth possible implementation of the fourth aspect, the storage unit is configured to store the command log of the first write transaction and the data log of the first write transaction in a shared storage system, where the server shares the storage system with a slave node of the server.

According to any one of the fourth aspect or the foregoing possible implementations of the fourth aspect, in a seventh possible implementation of the fourth aspect, the server further includes a sending unit configured to send the command log of the first write transaction and the data log of the first write transaction to the slave node of the server.

The fourth aspect is an apparatus implementation corresponding to the method in the first aspect. Descriptions in any one of the first aspect or the possible implementations of the first aspect are correspondingly applicable to any one of the fourth aspect or the possible implementations of the fourth aspect, and details are not described herein again.

According to a fifth aspect, a database system includes a client and a plurality of server nodes; the client is configured to send a first write transaction to a first server in the plurality of server nodes; the first server is configured to: receive the first write transaction, generate and store a command log of the first write transaction, and when detecting that the first write transaction is a multi-partition transaction, generate and store a data log of the first write transaction, where the multi-partition transaction includes a transaction for operating at least two partitions.

According to the fifth aspect, in a first possible implementation of the fifth aspect, when the first server is faulty, the first server is further configured to: obtain a data snapshot of the first server and command logs generated after a generation time point of the data snapshot; and when detecting that a write transaction corresponding to the obtained command log is a multi-partition transaction, obtain a data log of the write transaction corresponding to the obtained command log, and recover data by replaying the obtained data log, where the data snapshot is used to back up data for the first server.

According to the fifth aspect, in a second possible implementation of the fifth aspect, the first server is further configured to: receive a second write transaction; generate and store a command log of the second write transaction; and when detecting that the second write transaction is a non-deterministic transaction, generate and store a data log of the second write transaction, where at least two execution results of the non-deterministic transaction are not unique.

According to the second possible implementation of the fifth aspect, in a third possible implementation of the fifth aspect, when the first server is faulty, the first server is further configured to: obtain a data snapshot of the first server and command logs generated after a generation time point of the data snapshot; and when detecting that a write transaction corresponding to the obtained command log is a multi-partition transaction or a non-deterministic transaction, obtain a data log of the write transaction corresponding to the obtained command log, and recover data by replaying the obtained data log, where the data snapshot is used to back up data for the first server.

According to any one of the fifth aspect or the foregoing possible implementations of the fifth aspect, in a fourth possible implementation of the fifth aspect, the first server may store the data log of the first write transaction after sending a response message of the first write transaction to the client, where the response message of the first write transaction is used to indicate that execution of the first write transaction is completed; and the first server is configured to store the data log of the second write transaction before sending a response message of the second write transaction to the client, where the response message of the second write transaction is used to indicate that execution of the second write transaction is completed.

According to any one of the fifth aspect or the foregoing possible implementations of the fifth aspect, in a fifth possible implementation of the fifth aspect, the first server is configured to store the command log of the first write transaction before sending the response message of the first write transaction to the client, where the response message of the first write transaction is used to indicate that the execution of the first write transaction is completed; and the first server is configured to store the command log of the second write transaction before sending the response message of the second write transaction to the client, where the response message of the second write transaction is used to indicate that the execution of the second write transaction is completed.

According to any one of the fifth aspect or the foregoing possible implementations of the fifth aspect, in a sixth possible implementation of the fifth aspect, the first server is configured to store the command log of the first write transaction and the data log of the first write transaction in a shared storage system, and the first server shares the shared storage system with a second server in the plurality of server nodes, where the second server is a slave node of the first server.

According to any one of the fifth aspect or the foregoing possible implementations of the fifth aspect, in a seventh possible implementation of the fifth aspect, the first server is further configured to send the command log of the first write transaction and the data log of the first write transaction to the second server, where the second server is the slave node of the first server.

The fifth aspect is a system implementation corresponding to the method in the first aspect. Descriptions in any one of the first aspect or the possible implementations of the first aspect are correspondingly applicable to any one of the fifth aspect or the possible implementations of the fifth aspect, and details are not described herein again.

According to technical solutions disclosed, the server node may use different log policies by determining a type of a write transaction. If the write transaction is a multi-partition transaction, a data log of the write transaction is generated and stored, and subsequently data recovery for the multi-partition transaction is performed by using the data log. In this way, a data recovery speed is ensured. In addition, in the technical solutions disclosed, after receiving a write transaction, the server generates a command log of the write transaction regardless of a type of the write transaction, thereby reducing complexity of the system. For the write transaction whose data log is not generated, the command log serves as the backup of the server node. For the write transaction whose data log is generated, the command log may mark a multi-partition transaction, indicating that the write transaction has the data log and does not need extra marking information.

DESCRIPTION OF EMBODIMENTS

Figure 1:
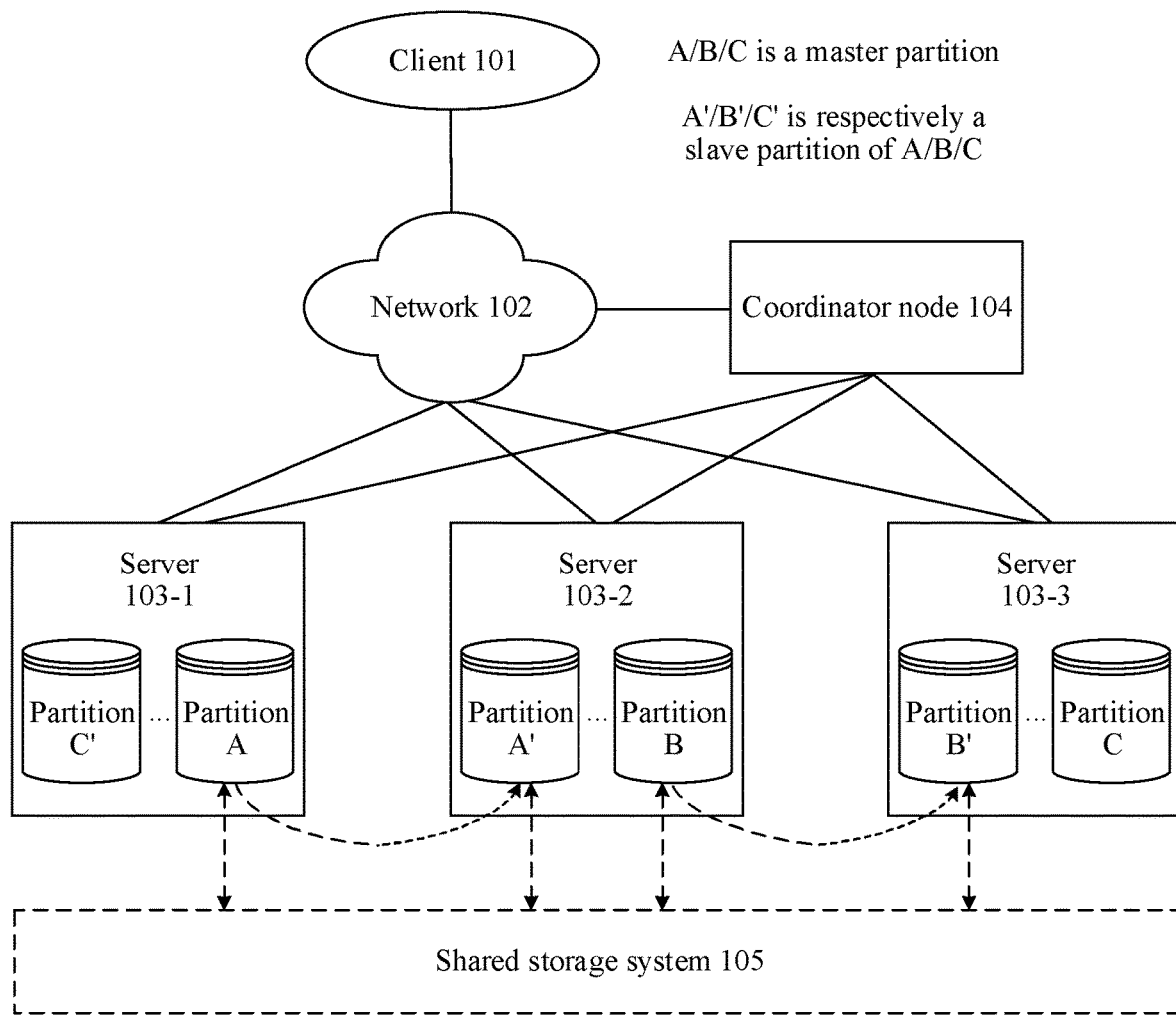
FIG. 1 is a schematic diagram of a logical structure of a database system according to an embodiment.

Embodiments are described below with reference to accompanying drawings.

Terms such as first and second are used to distinguish objects, but there is no logical or time sequence dependency between "first" and "second".

A transaction is short for a database transaction, and is a logical unit in an execution process of a database management system. Usually, the transaction refers to an access to a database performed by a user, and includes limited database operation sequences (for example, CNY100 is deducted from an account A, CNY100 is added to an account B, and the two operations are in one transaction).

A command log is used to record a transaction command for the database. For example, CNY100 is added to a user account whose user ID is 9527. The command log is also referred to as a logical log. A data log is used to record a result of a transaction operation. For example, a balance of the user whose user ID is 9527 is CNY200 (before the log takes effect, the balance of the user account is CNY100). The data log is also referred to as a physical log or binary log.

Log persistence means that a log is stored in a non-volatile storage medium.

One piece of data may have several copies in the database, and the copies are classified into master copies and slave copies. For a first server node, a backup that can provide a write service for a client is a master copy, and a backup of a master copy of another server node on the first server node is a slave copy for the first server node, in other words, a copy that provides a redundancy backup is a slave copy. For a piece of data, a partition storing the master copy is referred to as a master partition, a partition storing the slave copy is referred to as a slave partition, a server node storing the master copy is referred to as a master node, and a server node storing the slave copy is referred to as a slave node. The slave node needs to keep data synchronized with that of the master node, and may provide a read service for the user.

Partitioning means to physically decompose a table or an index into a plurality of smaller and more manageable parts. For an application accessing the database, there is only one table or index logically, but the table or the index may physically include dozens of physical partitions. Each partition is an independent object that can be processed independently or as part of a larger object.

User data may be stored in a plurality of database partitions in a distributed manner, and a transaction may be classified into a single-partition transaction and a multi-partition transaction. The single-partition transaction is a transaction in which only one partition needs to be operated, and the multi-partition transaction is a transaction in which a plurality of partitions needs to be operated. A write transaction is a transaction in which data in the database is modified. A multi-partition write transaction is a transaction in which a write operation is performed on any one of partitions that need to be operated in the multi-partition transaction.

A non-deterministic transaction is a transaction in which two execution results may be different. For example, an operation in a transaction, a structured query language (SQL), or a function may generate non-deterministic data such as a random number and a date, and the non-deterministic data affects a final result of the transaction. Results may be different if a non-deterministic transaction is executed a plurality of times.

A database log is classified into a command log and a data log, and the command log and the data log have respective features. The command log usually occupies smaller storage space and is generated independent of an execution result of a transaction. Generation of the command log and execution of the transaction can be performed in parallel. However, data recovery performed by using the command log is slower, and a non-deterministic transaction cannot be recovered. The data log usually occupies larger storage space and is generated depending on an execution result of a transaction. Generation of the data log and execution of the transaction are performed in serial. However, data recovery performed by using the command log is faster, and an execution result of any type of transaction can be recovered.

If only the command log or the data log is used in a database system, advantages of the command log and the data log cannot be appropriately combined. With reference to the advantages of the command log and the data log, performance of the database system is optimized while data security is ensured.

FIG. 1 is a schematic diagram of an architecture of a database system according to an embodiment. As shown in FIG. 1, the database system includes a client 101 and a plurality of server nodes, and the figure shows an example of three server nodes 103-1, 103-2, and 103-3. The client 101 communicates with the plurality of server nodes by using a network 102.

The network 102 may be the Internet, an intranet, a local area network (LAN), a wide area network (WAN), a storage area network (SAN), or the like, or any combination of the foregoing networks.

A partition A and a partition A' separately store a copy of same data, the partition A stores a master copy of the data, and the partition A' stores a slave copy of the data. Similarly, a partition B and a partition B' separately store a copy of same data, the partition B stores a master copy of the data, and the partition B' stores a slave copy of the data. A partition C and a partition C' separately store a copy of same data, the partition C stores a master copy of the data, and the partition C' stores a slave copy of the data. To meet a redundancy requirement, a plurality copies of the same data are stored on different server nodes.

If a transaction of the client is a multi-partition transaction, the database system needs to split the multi-partition transaction into single-partition transactions by using a coordinator node 104, and then send the split single-partition transaction to a corresponding server node for processing. Specifically, the client 101 sends the multi-partition transaction to the coordinator node 104 by using the network 102, and the coordinator node 104 splits the received multi-partition transaction into the single-partition transactions, and sends the single-partition transaction to a corresponding server node for processing.

There may be one coordinator node (as shown in the figure), and the coordinator node is configured to coordinate and process all multi-partition transactions. There may alternatively be a plurality of coordinator nodes, and the coordinator nodes are configured to divide and process the multi-partition transactions. For example, one coordinator node is configured to process a multi-partition write transaction, and one or more coordinator nodes are configured to process a multi-partition read transaction.

If the transaction of the client is a single-partition transaction, the client 101 may directly send, by using the network 102, the single-partition transaction to a corresponding server node for processing. The client 101 may alternatively send, by using the coordinator node 104, the single-partition transaction to the corresponding server node for processing.

The client may be a client device or a terminal device, and may be specifically a computing device on which client software is loaded. A specific implementation form of the client is not limited.

A master node may send a generated command log and data log to a slave node by using the network 102, so that the slave node recovers data by replaying the command log and the data log, thereby keeping data synchronized with that of the master node. The master node also stores backups of the command log and the data log for data recovery in the case of subsequent system breakdown or a data error. For example, the partition A and the partition A' are used as an example for description. The partition A may send, by using the network 102, a command log and a data log that are generated in the partition to the partition A', and the partition A' recovers data by using the received command log and data log, to synchronize data with that in the partition A. The partition A also stores backups of the command log and the data log for subsequent data recovery after the server 103-1 breaks down or an error occurs in data stored in the partition A.

The database system further includes a shared storage system 105. After generating the command log and the data log, the master node stores the command log and the data log in the shared storage system 105, and the slave node may read the command log and the data log from the shared storage system, and recover data by replaying the command log and the data log, to keep the data synchronized with that of the master node. The partition A and the partition A' are used as an example for description. After generating the command log and the data log based on a transaction, the partition A stores the command log and the data log in the shared storage system 105, and the partition A' obtains the command log and the data log from the shared storage system 105, and recovers data by replaying the command log and the data log, to keep the data synchronized with that in the partition A.

Figure 2:
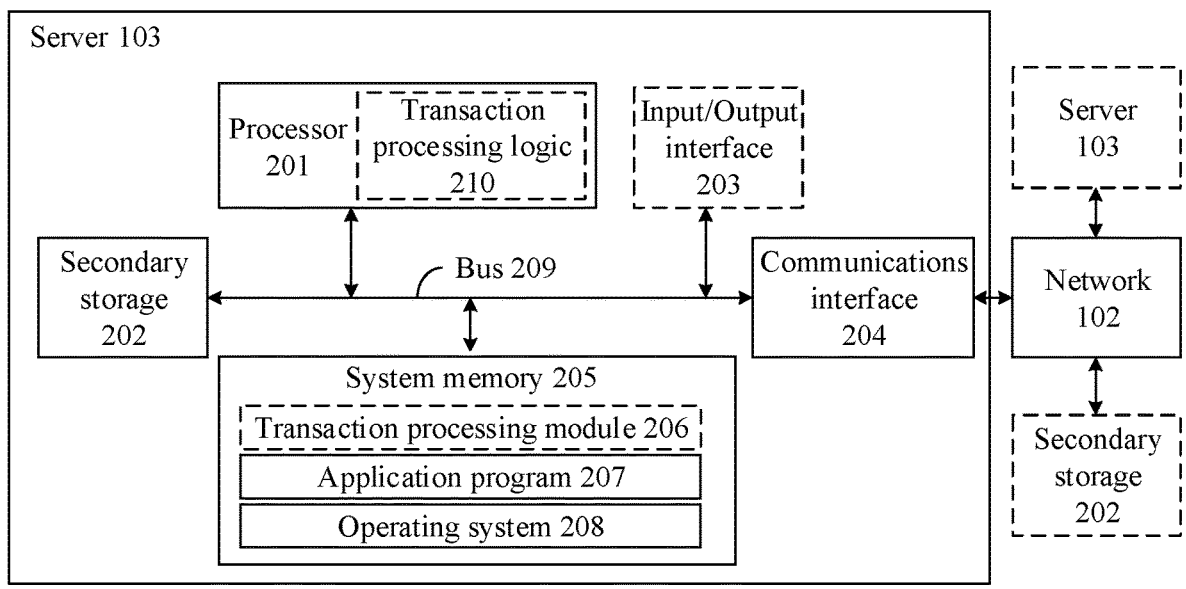
FIG. 2 is a schematic diagram of an organizational structure of a server node according to an embodiment.

FIG. 2 is a schematic structural diagram of a server 103 according to an embodiment.

As shown in FIG. 2, the server 103 includes a processor 201, and the processor 201 is connected to a system memory 205. The processor 201 may be a computing logic such as a central processing unit (CPU), a graphics processing unit (GPU), a field-programmable gate array (FPGA), or a digital signal processor (DSP), or any combination of the foregoing computing logics. The processor 201 may be a single-core processor or a multi-core processor.

The processor 201 may further include a transaction processing logic 210. The transaction processing logic 210 may be a specific hardware circuit or a firmware module integrated into the processor 201. If the transaction processing logic 210 is a specific hardware circuit, the transaction processing logic 210 performs the method. If the transaction processing logic 210 is a firmware module, the processor 210 executes firmware code in the transaction processing logic 210 to implement the technical solution. The transaction processing logic 210 includes: (1) a logic (circuit/ firmware code) configured to receive a write transaction; (2) a logic (circuit/firmware code) configured to generate a command log of the write transaction and store the command log of the write transaction; (3) a logic (circuit/ firmware code) configured to determine whether the write transaction is a multi-partition transaction; (4) a logic (circuit/firmware code) configured to generating a data log of the write transaction and store the data log of the write transaction.

A bus 209 is configured to transfer information between components of the server 103. The bus 209 may use a wired connection manner or a wireless connection manner. The bus 209 is further connected to a secondary storage 202, an input/output interface 203, and a communications interface 204.

Usually, the secondary storage 202 is also referred to as an external storage. A storage medium of the secondary storage 202 may be a magnetic medium (for example, a floppy disk, a hard disk, or a magnetic tape), an optical medium (for example, an optical disc), a semiconductor medium (for example, a solid-state drive (SSD)), or the like. In some embodiments, the secondary storage 202 may further include a remote memory separate from the processor 201, for example, a network disk (including a network or cluster file system such as a network file system (NFS)) accessed by using the communications interface 204 and a network 102. The secondary storage 202 is a storage medium of a database storage system, and is configured to store a data copy.

The input/output interface 203 is connected to an input/ output device, and is configured to receive input information and output an operation result. The input/output device may be a mouse, a keyboard, a display, a CD-ROM drive, or the like.

The communications interface 204 uses a transceiver apparatus, for example but not limited to, a transceiver, to implement communication with another device or the network 102. The communications interface 204 may be interconnected to the network 102 in a wired or wireless manner.

Some features of this embodiment may be implemented/ supported by the processor 201 executing software code in the system memory 205. The system memory 205 may include some software, for example, an operating system 208 (for example, Darwin, RTXC, Linux, Unix, OS X, Windows, or an embedded operating system (for example, Vxworks), an application program 207, and a transaction processing module 206.

The processor 201 executes the transaction processing module 206 to implement the technical solutions. The transaction processing module 206 includes: (1) code used to receive a write transaction; (2) code used to generate a command log of the write transaction and store the command log of the write transaction; (3) code used to determine whether the write transaction is a multi-partition transaction; (4) code used to generate a data log of the write transaction and store the data log of the write transaction.

In addition, FIG. 2 is merely an example of the server 103. The server 103 may include more or fewer components than those shown in FIG. 2, or may have a different component configuration manner. In addition, various components shown in FIG. 2 may be implemented by using hardware, software, or a combination of hardware and software.

Figure 3:
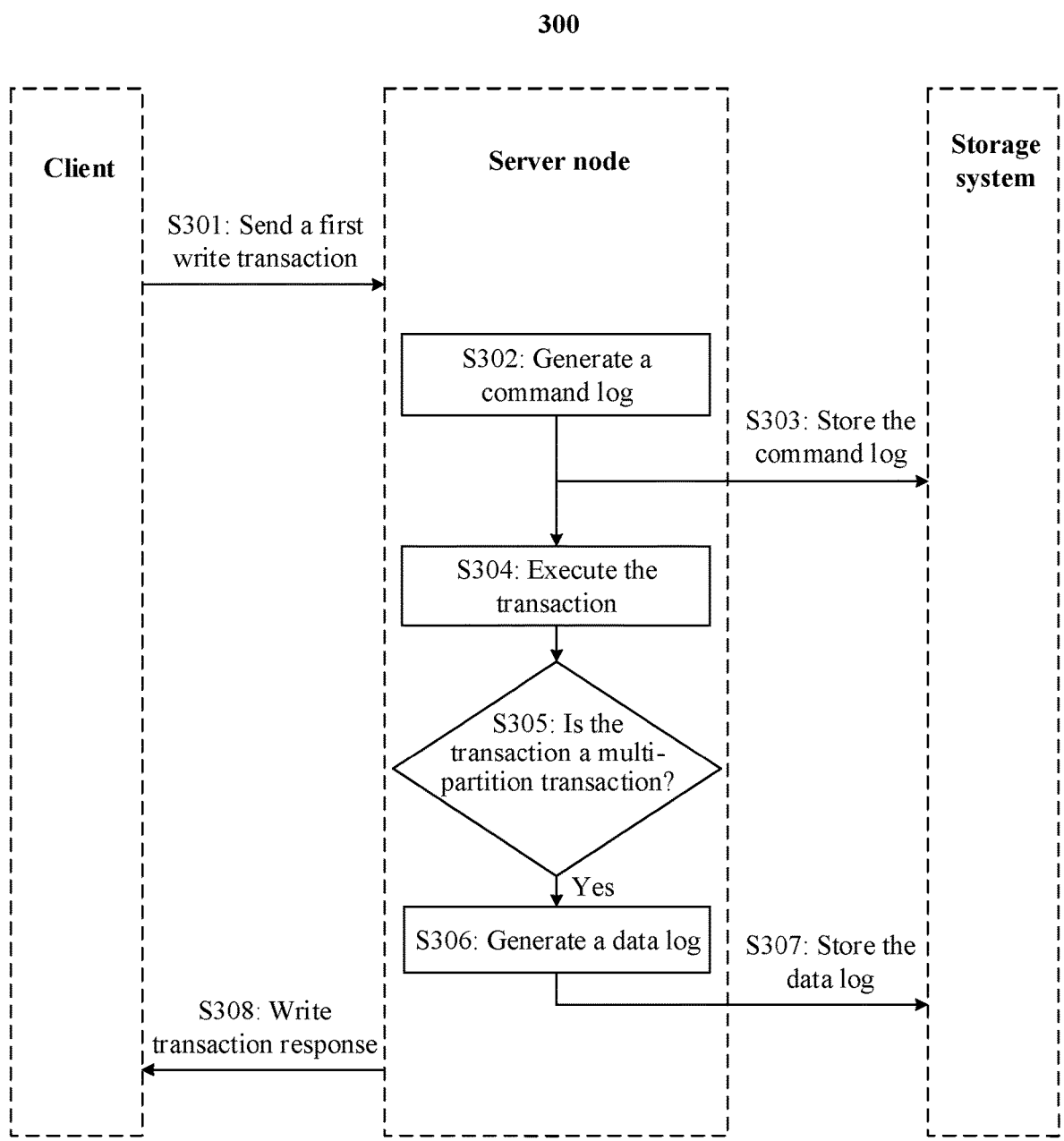
FIG. 3 is a schematic flowchart of a database log management method according to an embodiment.

FIG. 3 is a schematic flowchart of a log management method 300 according to an embodiment. As shown in FIG. 3, the method 300 includes the following steps.

S301: A client sends a first write transaction request to a server node.

In a distributed database system, the server node may be a master node of user data, that is, a node storing a master copy of the data, and may provide a write operation for a user.

If a first write transaction is a multi-partition transaction, the client may commit the multi-partition transaction to a coordinator node, and the coordinator node splits the multi-partition transaction into single-partition transactions, and allocates the single-partition transactions to corresponding server nodes for processing. If the first write transaction is a single-partition transaction, the client may directly send the first write transaction to a corresponding server node, or may send, by using the coordinator node, the write transaction to the corresponding server node for processing.

Certainly, even if the first write transaction is a multi-partition transaction, the client may also directly send the first write transaction to the server node, and the server node coordinates execution of the multi-partition transaction. A specific form of sending the write transaction request to the server node by the client is not limited.

S302: The server node generates a command log of the first write transaction.

After receiving the first write transaction of the client, the server node generates the command log of the write transaction based on the first write transaction. Because the command log does not depend on an execution result of the transaction and does not affect execution of the transaction, after receiving the first write transaction, the server node may directly generate the command log, and the execution of the transaction and generation of the command log may be performed in parallel. A generation time of the command log is not limited.

After receiving the first write transaction request, the server node generates the command log of the first write transaction regardless of a type of the write transaction. For a write transaction whose data log is not generated, the command log serves as a backup of the server node. When the server node is faulty, data may be recovered by replaying the command log. A slave node of the server node may synchronize with the server node by replaying the command log. For a write transaction whose data log is subsequently generated, the command log may have a marking function, and no extra marking information may be required to mark the write transaction whose data log exists. A storage sequence of the command log represents an execution sequence of the write transaction. The command log may carry a time stamp of generating the command log, and the server node determines the storage sequence of the command log based on the time stamp. The command log may also be stored in a storage space or a log file in sequence, and the server node may determine the storage sequence of the command log based on the sequence. When the server node recovers data or the slave node synchronizes the data, to ensure a recovery sequence of the write transaction, the data may be recovered based on the sequence of the command log. This ensures correctness of the data.

S303: The server node stores the command log of the first write transaction in a storage system.

The server node may store the command log of the first write transaction in a synchronous manner or an asynchronous manner. If a synchronous storage manner is used, before the command log is successfully stored, the server node cannot commit the transaction. To be specific, before sending a response message of the first write transaction, the server node stores the command log of the first write transaction, and the response message of the first write transaction is used to indicate that execution of the first write transaction is completed. If an asynchronous storage manner is used, committing the transaction by the server node is not affected by whether the command log is successfully stored.

If the synchronous storage manner is used, successful storage of the command log is a prerequisite for committing the write transaction, to ensure system security. However, if the synchronous storage manner is used, a system delay may be caused, and overall performance of the database system is affected.

S304: The server node executes the first write transaction.

A transaction includes a series of operations included in a database. It is considered that the server node successfully executes a write transaction only after all operations included in the write transaction are executed.

S305: The server node determines whether the first write transaction is a multi-partition transaction. If the first write transaction is a multi-partition transaction, step S306 is performed; or if the first write transaction is not a multi-partition transaction, step 308 is performed.

A transaction processing request may include dedicated partition indication information, and the partition indication information may indicate whether a to-be-processed transaction is a single-partition transaction or a multi-partition transaction.

Alternatively, the transaction processing request may not include the partition indication information, and a transaction type may be obtained by a server by parsing key information in the transaction processing request. A concept of a partition key is introduced to partitioning. The partition key is used to perform data aggregation based on an interval value (or a range value), a specific value list, or a hash function value, so that data is more regularly distributed in different partitions, and a large object becomes some small objects. When creating a table (a data table) or modifying a table, a user determines partition keys of the table. When the user performs a write request, a database analyzes the partition key in the write request, and determines whether the request is a multi-partition write transaction by analyzing whether the write request requires a plurality of partitions.

An execution sequence of step S304 and step S305 is not limited. There is no logical relationship between execution of S304 and that of S305. In some implementations, step S305 may be performed before step S304.

S306: The server node generates a data log of the first write transaction.

The data log mainly has the following two functions:

1. Backup: If the server node backs up a data snapshot at a time point T, and then uses the data log to record a modification performed by a multi-partition transaction on a master copy after the time point T, if the server node is faulty, during data recovery, a result of a write transaction can be recovered by using the data snapshot at the time point T and a data log generated after a generation time point of the data snapshot.

2. Copy replication: The data log of the server node records a modification to a multi-partition transaction. After obtaining the data log, the slave node can perform a same operation at the slave node based on content of the data log.

In an execution process of a multi-partition transaction, mutual communication or coordination between a plurality of partitions may be required. Consequently, usually the execution process is relatively complex, and an execution time is relatively long. For the multi-partition transaction, the server node generates and stores a data log of the transaction. When the server node rectifies a fault or the slave node synchronizes data subsequently, only the data log needs to be replayed.

S307: The server node stores the data log of the first write transaction in the storage system.

The server node can store the data log in the storage system in a synchronous manner or an asynchronous manner. If storage is performed in the synchronous manner, before committing a transaction, the server node needs to receive a write success feedback from the storage system. To be specific, before sending the response message of the first write transaction, the server stores the data log of the first write transaction, and the response message of the first write transaction is used to indicate that the execution of the first write transaction is completed. In this way, system data is more secure. If storage is performed in the asynchronous manner, before committing the transaction, the server node does not need to receive the write success feedback from the storage system. To be specific, after sending the response message of the first write transaction, the server may store the data log of the first write transaction, and a transaction processing speed is higher. However, after the transaction is committed, if the server node is faulty before a write operation is successfully performed, data in the data log is lost.

If the asynchronous storage manner is used, the server node may first store the data log in a cache, and after the transaction is committed a plurality of times, data in the cache is persistently stored in the storage system. A form of storing the data log by the server node is not limited.

The storage system may be a shared storage system of the server node and the slave node. The server node stores the command log and the data log of the write transaction in the shared storage system.

Optionally, the storage system is a storage system of the server node. Further, the server node further sends the command log and the data log of the write transaction to the slave node.

After generating the data log of the first write transaction, the server node may establish a correspondence between the data log of the first write transaction and the command log of the first write transaction.

S308: The server node sends a write transaction response to the client.

After executing the write transaction, the server node commits the write transaction, and after committing the transaction, sends the write transaction response to the client. The write transaction response is the response message of the first write transaction and is used to indicate that the execution of the first write transaction is completed. If the write transaction is a multi-partition transaction, the server node sends the write transaction response to the client by using the coordinator node.

The server node backs up data in the database system in a specific period. The backup is usually performed by using a data snapshot.

When the server node is faulty and data is lost, the server node first obtains a data snapshot of the server, and recovers the data based on the obtained data snapshot. The server node then obtains command logs generated after the data snapshot, and sequentially detects, in a storage sequence of the command logs, whether write transactions recorded in the command logs are multi-partition transactions. If the write transaction is a multi-partition transaction, the server node obtains a data log of the multi-partition transaction from the storage system, and recovers the data by replaying the data log. If the write transaction is not a multi-partition transaction, the server node may recover the data by replaying the command log. Certainly, even if the write transaction is not a multi-partition transaction, if the write transaction has a data log, the server node may also recover the data by replaying the data log of the write transaction.

The data snapshot may be specifically a latest data snapshot of the server. The server may periodically back up the data snapshot in the time period. A recovery speed may be increased by selecting the latest data snapshot during data recovery.

If the first write transaction is a multi-partition transaction, the server node generates and stores the command log and the data log of the first write transaction. In a data recovery process, the server node obtains the command log of the first write transaction, and when detecting, based on the command log of the first write transaction, that the first write transaction is a multi-partition transaction, the server node obtains the data log of the first write transaction, and recovers the data by replaying the data log of the first write transaction. If the first write transaction is not a multi-partition transaction, the server node may recover the data by replaying the data log of the first write transaction. Certainly, even if the first write transaction is not a multi-partition transaction, the server node may generate and store the data log of the first write transaction based on a log policy of the user. In addition, in the data recovery process, the data is recovered by replaying the data log of the first write transaction.

The command log does not depend on an execution result of a transaction. After receiving the write transaction, the server node can generate and store the command log of the write transaction. However, the data log depends on an execution result of the write transaction, and the data log can be generated only after the transaction is executed. After generating and storing the command log, if the server node is faulty before successfully storing the command log, the storage system stores only the command log of the multi-partition transaction, and does not store the data log of the multi-partition transaction. In the data recovery process, if the server node detects that a read transaction recorded in a command log is a multi-partition transaction, but the storage system does not store a data log corresponding to the multi-partition transaction, it indicates that the multi-partition write transaction may not be completed, and the server node may terminate data recovery. Certainly, the server node may alternatively recover the transaction based on the command log of the multi-partition transaction.

Similarly, the slave node of the server node obtains command logs from the database system, and sequentially detects, in the storage sequence of the command logs, whether write transactions recorded in the command logs are multi-partition transactions. If the write transaction is a multi-partition transaction, the slave node obtains a data log of the multi-partition transaction, and keeps data synchronized with that of the server node by replaying the data log. If the write transaction is not a multi-partition transaction, the slave node may keep the data synchronized with that of the server node by replaying the command log. Certainly, even if the write transaction is not a multi-partition transaction, if the write transaction has a data log, the slave node may still keep the data synchronized with that of the server node by replaying the data log of the write transaction.

Execution results of a non-deterministic transaction may be different. If a command log of the non-deterministic transaction is used for backup, a data recovery error may occur when a data fault occurs on the server node and data is recovered by replaying the command log of the non-deterministic transaction. In addition, if the slave node replicates a slave copy based on the command log of the non-deterministic transaction, data of the server node may be inconsistent with that of the slave node.

The method 300 may further include: receiving, by the server, a second write transaction; generating and storing a command log of the second write transaction; and detecting whether the second write transaction is a multi-partition transaction; and if detecting that the second write transaction is a non-deterministic transaction, generating and storing a data log of the second write transaction.

When the server is faulty, the method 300 may further include: obtaining, by the server, a data snapshot of the server and command logs generated after a generation time point of the data snapshot; and when detecting that a write transaction corresponding to the obtained command log is a multi-partition transaction or a non-deterministic transaction, obtaining a data log of the write transaction corresponding to the obtained command log, and recovering data by replaying the obtained data log.

Optionally, the server stores the data log of the first write transaction after sending the response message of the first write transaction, and stores the data log of the second write transaction before sending the response message of the second write transaction. The response message of the first write transaction is used to indicate that the execution of the first write transaction is completed, and the response message of the second write transaction is used to indicate that the execution of the second write transaction is completed.

Optionally, the server stores the command log of the first write transaction before sending the response message of the first write transaction, and also stores the command log of the second write transaction before sending the response message of the second write transaction.

Figure 4:
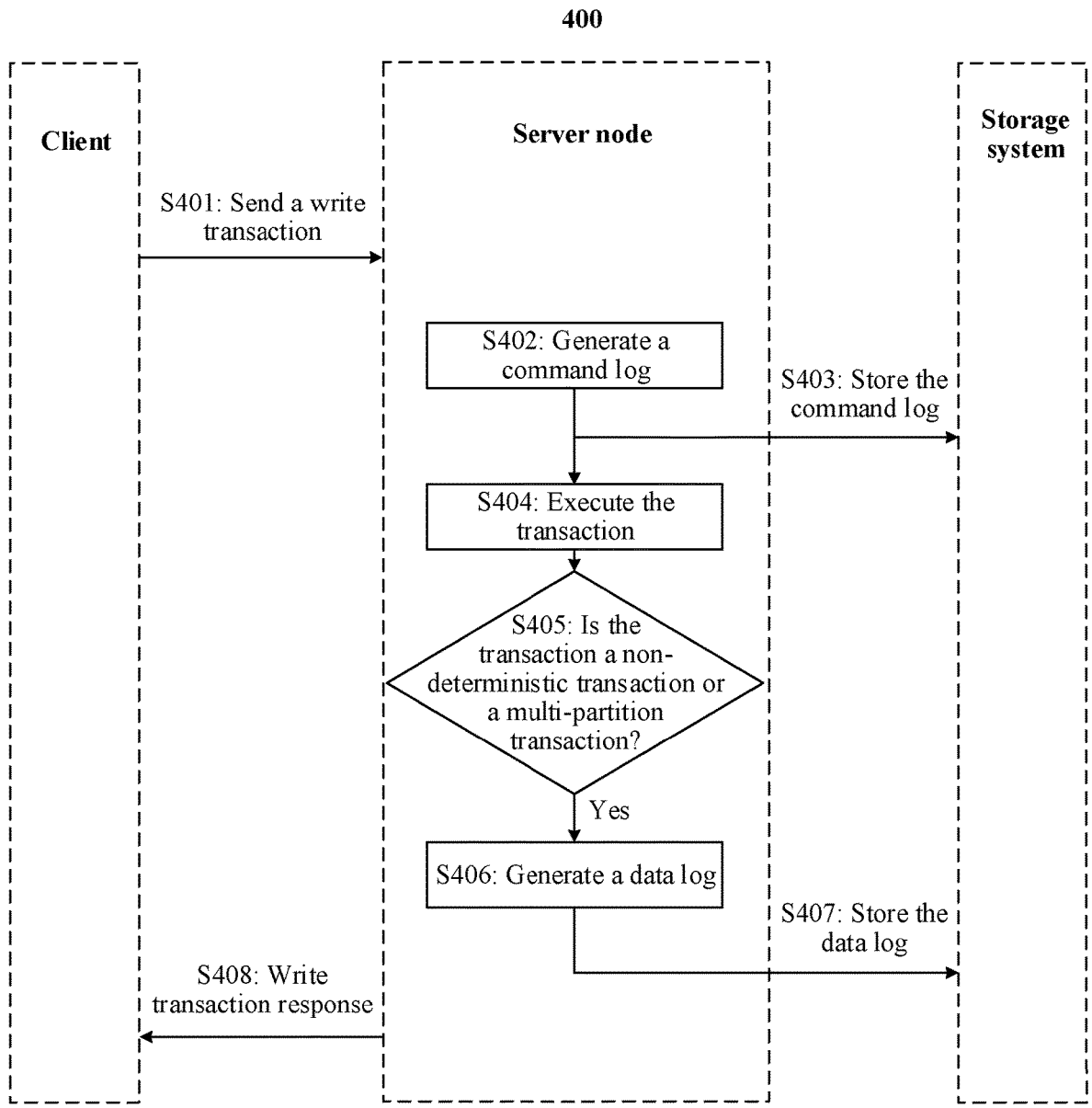
FIG. 4 is a schematic flowchart of a database log management method according to an embodiment.

The server node may further determine whether a write transaction is a non-deterministic transaction. If the write transaction is a non-deterministic transaction, even if the write transaction is not a multi-partition transaction, the server node generates a data log of the write transaction based on an execution result of the write transaction, and stores the data log. This ensures system stability. Specifically, as shown in FIG. 4, a method 400 includes the following steps.

For S401 to S404, refer to step S301 to S304, and details are not described herein again.

S405: The server node determines whether the write transaction is a non-deterministic transaction or a multi-partition transaction; and if the write transaction is a non-deterministic transaction or a multi-partition transaction, the server node performs step S406; or if the write transaction is not a non-deterministic transaction or a multi-partition transaction, the server node performs step S408.

The non-deterministic transaction is a transaction whose execution result is not unique. At least two execution results of the non-deterministic transaction are not unique, that is, two execution results may be different. For example, an operation in a transaction, a structured query language, or a function may generate non-deterministic data such as a random number and a date, and the non-deterministic data affects a final result of the transaction.

The server node may detect whether the write transaction is a non-deterministic transaction by detecting whether the write transaction carries a first identifier. If the write transaction is a non-deterministic transaction, the client writes the first identifier into the write transaction. The first identifier is used to indicate that the write transaction is a non-deterministic transaction. If the server node detects that the write transaction carries the first identifier, the write transaction is a non-deterministic transaction; or if the server node detects that the write transaction does not carry the first identifier, the write transaction is not a non-deterministic transaction.

The server node further detects whether the write transaction is a non-deterministic transaction by detecting a value of a second identifier carried in the write transaction. For example, the second identifier may be a 1-bit indicator bit. If the write transaction is a non-deterministic transaction, the client sets the second identifier in the write transaction to "1"; and if the write transaction is not a non-deterministic transaction, the client sets the second identifier in the write transaction to "0". If the server node detects that the second identifier in the write transaction is "1", the write transaction is a non-deterministic transaction. If the server node detects that the second identifier in the write transaction is "0", the write transaction is not a non-deterministic transaction.

The server node may further detect whether the write transaction is a non-deterministic transaction by analyzing the write transaction. If it is detected that the operation in the write transaction, the structured query language, or the function generates the non-deterministic data such as the random number and a current time, it indicates that the write transaction is a non-deterministic transaction; or if it is detected that the operation in the write transaction, the structured query language, or the function does not generate the non-deterministic data such as the random number and a current time, the write transaction is not a non-deterministic transaction.

It should be understood that a specific detection manner of the write transaction is not limited.

The server node may first detect whether the write transaction is a non-deterministic write transaction. If the write transaction is a non-deterministic transaction, the server node terminates the detection, and performs step S406; and if the write transaction is not a non-deterministic transaction, the server node continues to detect whether the write transaction is a multi-partition transaction. If the write transaction is a multi-partition transaction, the server node performs step S406, and if the write transaction is not a multi-partition transaction either, the server node performs step S408. The server node may alternatively first detect whether the write transaction is a multi-partition transaction. If the write transaction is a multi-partition transaction, the server node terminates the detection, and performs step S406; and if the write transaction is not a multi-partition transaction, the server node continues to detect whether the write transaction is a non-deterministic transaction. If the write transaction is a non-deterministic transaction, the server node performs step S406, and if the write transaction is not a non-deterministic transaction either, the server node performs step S408. This embodiment does not limit a sequence of detecting whether the write transaction is a non-deterministic transaction or a multi-partition transaction by the server node.

For S406 to S408, refer to step S306 to S308, and details are not described herein again.

When the server node is faulty and data is lost, the server node first obtains a latest data snapshot and recovers the data based on the latest data snapshot. The server node then obtains command logs generated after the latest data snapshot, and sequentially determines, in a storage sequence, whether write transactions recorded in the command logs are non-deterministic transactions or multi-partition transactions. If the write transaction is a non-deterministic transaction or a multi-partition transaction, the server node obtains a data log of the write transaction from the storage system, and recovers the data by replaying the data log. If the write transaction is not a non-deterministic transaction or a multi-partition transaction, the server node may recover the data by replaying the command log. Certainly, even if the write transaction is not a non-deterministic transaction or a multi-partition transaction, if the write transaction has a data log, the server node may also recover the data by replaying the data log of the write transaction.

The server node may first detect, based on the command log of the write transaction, whether the write transaction is a non-deterministic write transaction. If the write transaction is a non-deterministic transaction, the server node terminates the detection, obtains the data log corresponding to the write transaction, and recovers the data by replaying the data log; and if the write transaction is not a non-deterministic transaction, the server node continues to detect, based on the command log of the write transaction, whether the write transaction is a multi-partition transaction. If the write transaction is a multi-partition transaction, the server node obtains the data log corresponding to the write transaction, and recovers the data by replaying the data log; and if the write transaction is not a multi-partition transaction either, the server node may recover the data by replaying the command log. The server node may also detect, based on the command log of the write transaction, whether the write transaction is a multi-partition transaction. If the write transaction is a multi-partition transaction, the server node terminates the detection, obtains the data log corresponding to the write transaction, and recovers the data by replaying the data log; and if the write transaction is not a multi-partition transaction, the server node continues to detect, based on the command log of the write transaction, whether the write transaction is a non-deterministic transaction. If the write transaction is a non-deterministic transaction, the server node obtains the data log corresponding to the write transaction, and recovers the data by replaying the data log; and if the write transaction is not a non-deterministic transaction either, the server node may recover the data by replaying the command log. This embodiment does not limit the sequence of detecting whether the write transaction is a non-deterministic transaction or a multi-partition transaction by the server node.

Similarly, the slave node of the server node obtains command logs from a database system, and sequentially determines, in the storage sequence, whether write transactions recorded in the command logs are non-deterministic transactions or multi-partition transactions. If the write transaction is a non-deterministic transaction or a multi-partition transaction, the slave node obtains a data log of the write transaction, and keeps data synchronized with that of the server node by replaying the data log. If the write transaction is not a non-deterministic transaction or a multi-partition transaction, the slave node may keep the data synchronized with that of the server node by replaying the command log. Certainly, even if the write transaction is not a non-deterministic transaction or a multi-partition transaction, if the write transaction has a data log, the slave node may also keep the data synchronized with that of the server node by replaying the data log of the write transaction.

The slave node of the server node may first detect, based on the write transaction command log, whether the write transaction is a non-deterministic write transaction. If the write transaction is a non-deterministic transaction, the slave node terminates the detection, obtains the data log corresponding to the write transaction, and synchronizes data by replaying the data log; and if the write transaction is not a non-deterministic transaction, the slave node continues to detect, based on the command log of the write transaction, whether the write transaction is a multi-partition transaction. If the write transaction is a multi-partition transaction, the slave node obtains the data log corresponding to the write transaction, and synchronizes data by replaying the data log; and if the write transaction is not a multi-partition transaction, the slave node can synchronize data by replaying the command log. The slave node of the server node may alternatively first detect, based on the command log of the write transaction, whether the write transaction is a multi-partition transaction. If the write transaction is a multi-partition transaction, the slave node terminates the detection, obtains the data log corresponding to the write transaction, and synchronizes data by replaying the data log; and if the write transaction is not a multi-partition transaction, the slave node continues to detect, based on the command log of the write transaction, whether the write transaction is a non-deterministic transaction. If the write transaction is a non-deterministic transaction, the slave node obtains the data log corresponding to the write transaction, and synchronizes data by replaying the data log; and if the write transaction is not a non-deterministic transaction either, the slave node may synchronize data by replaying the command log. This embodiment does not limit the sequence of detecting whether the write transaction is a non-deterministic transaction or a multi-partition transaction by the slave node.

A manner of obtaining the command log and the data log by the slave node is described in the embodiment in FIG. 3, and details are not described herein again.

The server node may store the command log and the data log of the write transaction in a synchronous manner or an asynchronous manner. If the synchronous manner is used, a log needs to be stored before a response message of the write transaction is sent; and if the asynchronous manner is used, the log may be stored after the response message of the write transaction is sent.

Figure 5:
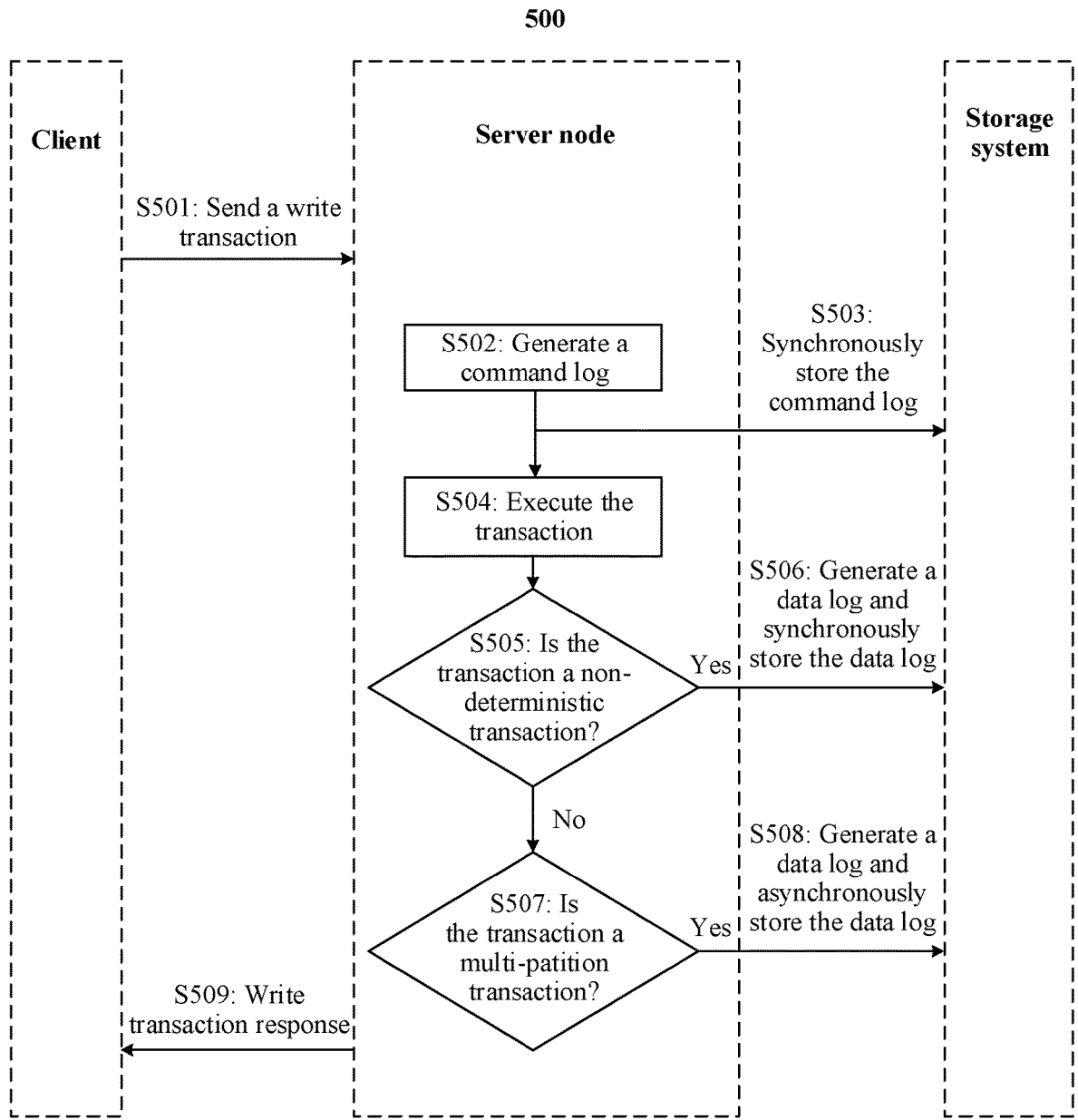
FIG. 5 is a schematic flowchart of a database log management method according to an embodiment.

Two execution results of a non-deterministic transaction may be different. The master node cannot recover data of the non-deterministic transaction based on the command log, and the slave node cannot keep the data synchronized with that of the master node based on the command log either. The system has a relatively high requirement on security of a data log of a non-deterministic transaction. For a multi-partition transaction, the master node may recover data based on a command log of the multi-partition transaction, and the slave node may also keep data synchronized with that of the master node based on the command log of the multi-partition transaction. Synchronous storage has high security, but affects overall performance of the system. The server node may use different storage policies for a non-determined transaction and a multi-partition transaction. As shown in FIG. 5, a method 500 includes the following steps.

For S501, refer to S301. For S502, refer to S302. Details are not described herein again.

S503: The server node synchronously stores the command log.

For a write transaction in which no data log is stored, when the server node is faulty, data can be recovered by using only the command log. A slave node can also keep synchronized with a master node by using only the command log. To ensure system security, the server node stores the command log in a synchronous manner. In addition, the command log does not depend on an execution result of a transaction and does not affect execution of the transaction. After receiving a write transaction, the server node may directly generate a command log. Execution of the transaction and generation of the command log may be performed in parallel. The server node may select a more secure storage policy to store the command log of the transaction.

For S504, refer to step S304, and details are not described herein again.

S505: The server node determines whether the write transaction is a non-deterministic transaction, and if the write transaction is a non-deterministic transaction, the server node performs step S506; and if the write transaction is not a non-deterministic transaction, the server node performs step S507.

S506: The server node generates a data log of a non-deterministic transaction, and synchronously stores the data log.

When the master node is faulty, data cannot be recovered by using a command log of a non-deterministic transaction. The slave node cannot keep data synchronized with that of the master node by using the command log of the non-deterministic transaction. To ensure the system security, the server node stores a data log of a non-deterministic transaction in a synchronous storage manner.

S507: The server node determines whether the write transaction is a multi-partition transaction, and if the write transaction is a multi-partition transaction, the server node performs step S508, or if the write transaction is not a multi-partition transaction, the server node performs step S509.

S508: The server node generates a data log of the multi-partition transaction and asynchronously stores the data log.

If the data log of the multi-partition transaction is stored in a synchronous manner, before committing the transaction, the server node needs to receive a feedback indicating that a write operation is successful from a storage system. This affects a transaction processing speed. Although an execution process of the multi-partition transaction is usually complex, the master node may also recover data or the slave node may also synchronize data by replaying a command log of the multi-partition transaction. The data log of the multi-partition transaction is stored in an asynchronous manner. Before committing the transaction, the server node does not need to receive the feedback indicating that the write operation is successful from the storage system, and the transaction processing speed is higher.

For step S509, refer to step S308, and details are not described herein again.

The server node may also first determine whether the write transaction is a multi-partition transaction. If the write transaction is a multi-partition transaction, the server node generates the data log of the write transaction, and asynchronously stores the data log of the write transaction; and if the write transaction is not a multi-partition transaction, the server node continues to detect whether the write transaction is a non-deterministic transaction, and if the write transaction is a non-deterministic transaction, the server node generates the data log of the write transaction, and synchronously stores the data log of the write transaction.

In the foregoing embodiment, the storage system may be a shared storage system of the server node and the slave node. The server node stores the command log and the data log of the write transaction in the shared storage system, and the command log and the data log in the shared storage system may be accessed by the server node and the slave node. When the server node is faulty, data recovery may be performed by using the command log and/or the data log in the shared storage system. The slave node may obtain the command log and the data log from the shared storage system, and replay the command log and the data log to ensure data synchronized with that of the server node. For example, the server node stores a command log of a first write transaction and a data log of the first write transaction in the shared storage system, and stores a command log of a second write transaction and a data log of the second write transaction in the shared storage system.

Optionally, in the foregoing embodiment, the storage system is a storage system of the server node. When the server node is faulty, data may be recovered by using the command log or the data log in the shared storage system. Further, the server node further sends the command log and the data log of the write transaction to the slave node, and the slave node ensures that data is synchronized with that of the server node by replaying the command log or the data log. For example, the server node sends the command log of the first write transaction and the data log of the first write transaction to the slave node of the server, and sends the command log of the second write transaction and the data log of the second write transaction to the slave node of the server.

Figure 6:
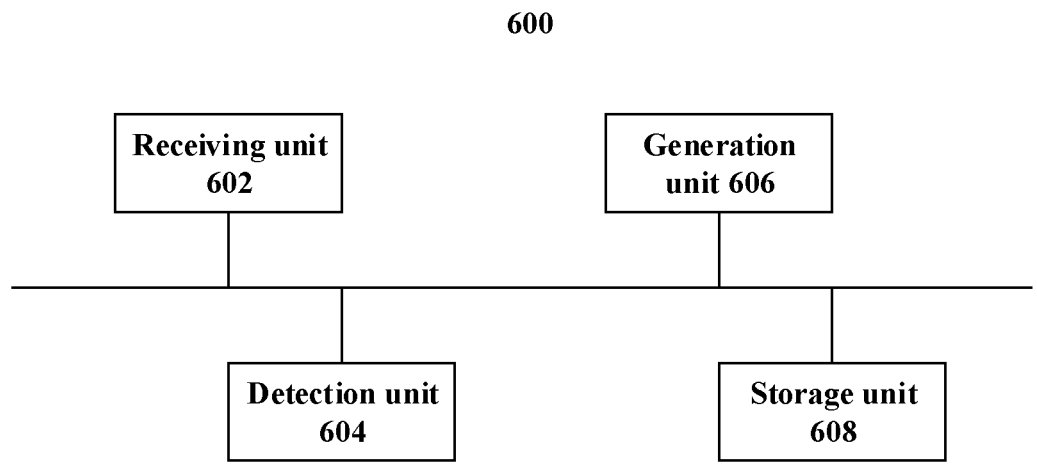
FIG. 6 is a schematic diagram of a logical structure of a server according to an embodiment.

FIG. 6 is a schematic diagram of a logical structure of a server node 600 according to an embodiment. The server node 600 is applied to a data storage system, and the data storage system includes a client and a plurality of server nodes 600. As shown in FIG. 6, the server node 600 includes: a receiving unit 602 configured to receive a first write transaction; a generation unit 604 configured to generate a command log of the first write transaction; a detection unit 606 configured to detect whether the first write transaction is a multi-partition transaction, where the multi-partition transaction includes a transaction for operating at least two partitions, where the generation unit 604 is further configured to generate a data log of the first write transaction when the detection unit 606 detects that the first write transaction is a multi-partition transaction; and a storage unit 608 configured to store the command log of the first write transaction and a data log of the first write transaction.

Figure 7:
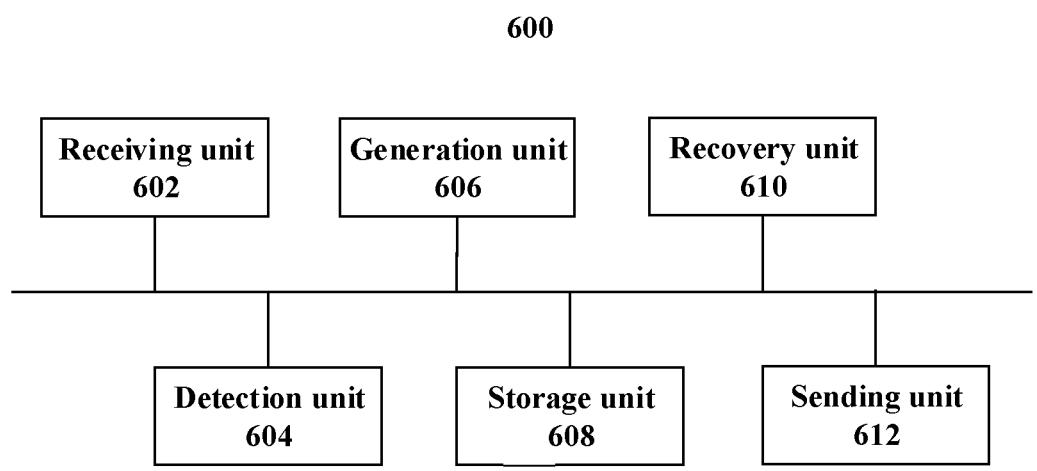
FIG. 7 is a schematic diagram of a logical structure of a server according to an embodiment.

As shown in FIG. 7, the server further includes a recovery unit 610.

Optionally, the recovery unit 610 is configured to: when the server is faulty, obtain a data snapshot of the server and command logs generated after a generation time point of the data snapshot; the detection unit 606 is further configured to detect whether a write transaction corresponding to the obtained command log is a multi-partition transaction; the recovery unit 610 is further configured to: when the detection unit 606 detects that the write transaction corresponding to the obtained command log is a multi-partition transaction, obtain a data log of the write transaction corresponding to the obtained command log, and recover data by replaying the obtained data log.

Optionally, the receiving unit 602 is further configured to receive a second write transaction; the generation unit 604 is further configured to generate a command log of the second write transaction; the detection unit 606 is further configured to detect whether the second write transaction is a non-determined transaction; the generation unit 604 is further configured to generate a data log of the second write transaction when the detection unit 606 detects that the second write transaction is a non-determined transaction; and the storage unit 608 is further configured to store the command log of the second write transaction and a data log of the second write transaction, where at least two execution results of the non-deterministic transaction are not unique.

Optionally, the recovery unit 610 is configured to: when the server is faulty, obtain a data snapshot of the server and command logs generated after a generation time point of the data snapshot; and the detection unit 606 is further configured to detect whether a write transaction corresponding to the obtained command log is a non-deterministic transaction or a multi-partition transaction; and the recovery unit 610 is further configured to: when the detection unit 606 detects that the write transaction corresponding to the obtained command log is a non-deterministic transaction or a multi-partition transaction, obtain a data log of the write transaction corresponding to the obtained command log, and recover data by replaying the obtained data log. The data snapshot is used to back up data for the server.

Optionally, the storage unit 608 is configured to store the data log of the first write transaction after the server sends a response message of the first write transaction, where the response message of the first write transaction is used to indicate that execution of the first write transaction is completed; and the storage unit 608 is configured to store the data log of the second write transaction before the server sends a response message of the second write transaction, where the response message of the second write transaction is used to indicate that execution of the second write transaction is completed.

Optionally, the storage unit 608 is configured to store the command log of the first write transaction before the server sends the response message of the first write transaction, where the response message of the first write transaction is used to indicate that the execution of the first write transaction is completed; and the storage unit 608 is configured to store the command log of the second write transaction before the server sends the response message of the second write transaction, where the response message of the second write transaction is used to indicate that the execution of the second write transaction is completed.

Optionally, the storage unit 608 is configured to store the command log of the first write transaction and the data log of the first write transaction in a shared storage system, and the server shares the shared storage system with a slave node of the server.

Optionally, as shown in FIG. 7, the server further includes a sending unit 612 configured to send the command log of the first write transaction and the data log of the first write transaction to the slave node of the server.

The receiving unit 602 and the sending unit 612 may be specifically implemented by the processor 201 and the communications interface 204 in FIG. 2, or may be implemented by the processor 201, the communications interface 204, and the transaction processing module 206 in the system memory 205 in FIG. 2.

The detection unit 604, the generation unit 606, the storage unit 608, and the recovery unit 610 may be specifically implemented by the transaction processing logic 210 in the processor 201 in FIG. 2, or may be implemented by the processor 201 and the transaction processing module 206 in the system memory 205 in FIG. 2.

The transaction processing logic 210 may include the receiving unit 602, the detection unit 604, the generation unit 606, and the storage unit 608. The transaction processing logic 210 may further include the recovery unit 610 and the sending unit 612.

The transaction processing module 206 may include the receiving unit 602, the detection unit 604, the generation unit 606, and the storage unit 608. The transaction processing module 206 may further include the recovery unit 610 and the sending unit 612.

This embodiment is an apparatus embodiment of the server node corresponding to the embodiments in FIG. 1 to FIG. 5. Feature descriptions in the embodiments in FIG. 1 to FIG. 5 are applicable to this embodiment, and details are not described herein again.

The foregoing embodiments are merely intended for describing the technical solutions, but not for limiting this disclosure. Although this disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the claims.

What is claimed is:

1. A database log management method implemented by a server and comprising:
   receiving a first write transaction;
   generating a first command log of the first write transaction;
   storing the first command log;
   detecting that the first write transaction is a first multi-partition transaction for operating at least two partitions;
   generating, based on detecting that the first write transaction is the first multi-partition transaction, a first data log of the first write transaction; and
   storing the first data log.

2. The database log management method of claim 1, wherein when the server is faulty, the database log management method further comprises:
   obtaining a data snapshot that backs up first data for the server;
   obtaining a second command log generated after a generation time point of the data snapshot;
   obtaining a second data log of a second write transaction corresponding to the second command log when the second write transaction is a second multi-partition transaction; and
   recovering second data by replaying the second data log.

3. The database log management method of claim 1, further comprising:
   receiving a second write transaction;
   generating a second command log of the second write transaction;
   storing the second command log;
   detecting that the second write transaction is a non-deterministic transaction for which at least two execution results are not unique;
   generating a second data log of the second write transaction; and
   storing the second data log.

4. The database log management method of claim 3, wherein when the server is faulty, the database log management method further comprises:
   obtaining a data snapshot that backs up first data for the server;
   obtaining a third command log generated after a generation time point of the data snapshot;
   obtaining a third data log of a third write transaction corresponding to the third command log when the third write transaction is a third multi-partition transaction or a third non-deterministic transaction; and
   recovering second data by replaying the third data log.

5. The database log management method of claim 3, further comprising:
   sending, after storing the first command log, a first response message of the first write transaction, wherein the first response message indicates that execution of the first write transaction has completed; and
   sending, after storing the second command log, a second response message of the second write transaction, wherein the second response message indicates that execution of the second write transaction has completed.

6. The database log management method of claim 1, further comprising:
   sharing a shared storage system with a slave node of the server;
   further storing the first command log in the shared storage system; and
   further storing the first data log in the shared storage system.

7. The database log management method of claim 1, further comprising sending the first command log and the first data log to a slave node of the server.

8. A server in a database system and comprising:
   a memory configured to store instructions;
   a processor coupled to the memory and configured to execute the instructions to cause the server to:
   receive a first write transaction;
   generate a first command log of the first write transaction;
   store the first command log;
   detect that the first write transaction is a first multi-partition transaction for operating at least two partitions;
   generate, based on detecting that the first write transaction is the first multi-partition transaction, a first data log of the first write transaction; and
   store the first data log.

9. The server of claim 8, wherein when the server is faulty, the processor is further configured to execute the instructions to cause the server to:
   obtain a data snapshot that backs up first data for the server;
   obtain a second command log generated after a generation time point of the data snapshot;
   obtain a second data log of a second write transaction corresponding to the second command log when the second write transaction is a second multi-partition transaction; and
   recover second data by replaying the second data log.

10. The server of claim 8, wherein the processor is further configured to execute the instructions to cause the server to:
    receive a second write transaction;
    generate a second command log of the second write transaction;
    store the second command log;
    detect that the second write transaction is a non-deterministic transaction for which at least two execution results are not unique;
    generate a second data log of the second write transaction; and
    store the second data log.

11. The server of claim 10, wherein when the server is faulty, the processor is further configured to execute the instructions to cause the server to:
    obtain a data snapshot that backs up first data for the server;
    obtain a third command log generated after a generation time point of the data snapshot;
    obtain a third data log of a third write transaction corresponding to the third command log when the third write transaction is a third multi-partition transaction or a third non-deterministic transaction; and recover second data by replaying the third data log.

12. The server of claim 10, wherein the processor is further configured to execute the instructions to cause the server to:

send, after storing the first command log, a first response message of the first write transaction, wherein the first response message indicates that execution of the first write transaction has completed; and send, after storing the second command log, a second response message of the second write transaction, wherein the second response message indicates that execution of the second write transaction has completed.

13. The server of claim 8, wherein the processor is further configured to execute the instructions to cause the server to:

share a shared storage system with a slave node of the server;

further store the first command log in the shared storage system; and further store the first data log in the shared storage system.

14. The server of claim 8, wherein the processor is further configured to execute the instructions to cause the server to send the first command log and the first data log to a slave node of the server.

15. A database system comprising:

a client configured to send a first write transaction; and a first server communicatively coupled to the client and configured to:

receive the first write transaction from the client;

generate a first command log of the first write transaction;

store the first command log;

detect that the first write transaction is a first multi-partition transaction for operating at least two partitions;

generate, based on detecting that the first write transaction is the first multi-partition transaction, a first data log of the first write transaction; and store the first data log.

16. The database system of claim 15, wherein when the first server is faulty, the first server is further configured to:

obtain a data snapshot that backs up first data for the first server;

obtain a second command log generated after a generation time point of the data snapshot;

obtain a second data log of a second write transaction corresponding to the second command log when the second write transaction is a second multi-partition transaction; and recover second data by replaying the second data log.

17. The database system of claim 15, wherein the first server is further configured to:

receive a second write transaction;

generate a second command log of the second write transaction;

store the second command log;

detect that the second write transaction is a non-deterministic transaction for which at least two execution results are not unique;

generate a second data log of the second write transaction; and store the second data log.

18. The database system of claim 17, wherein when the first server is faulty, the first server is further configured to:

obtain a data snapshot that backs up first data for the first server;

obtain a third command log generated after a generation time point of the data snapshot;

obtain a third data log of a third write transaction corresponding to the third command log when the third write transaction is a third multi-partition transaction or a third non-deterministic transaction; and recover second data by replaying the third data log.

19. The database system of claim 17, wherein the first server is further configured to:

send, after storing the first command log, a first response message of the first write transaction to the client, wherein the first response message indicates that execution of the first write transaction has completed; and send, to the client after storing the second command log, a second response message of the second write transaction, wherein the second response message indicates that execution of the second write transaction has completed.

20. The database system of claim 15, further comprising a second server that is a slave node of the first server, wherein the first server is further configured to:

share a shared storage system with the second server;

further store the first command log in the shared storage system; and further store the first data log in the shared storage system.

* * * * *